(12) United States Patent
Safai et al.

(10) Patent No.: US 11,047,745 B2
(45) Date of Patent: Jun. 29, 2021

(54) LIGHTWEIGHT FIRE DETECTION SYSTEMS AND METHODS

(71) Applicant: The Boeing Company, Chicago, IL (US)

(72) Inventors: Morteza Safai, Newcastle, WA (US); Kimberly D. Meredith, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 545 days.

(21) Appl. No.: 14/966,878

(22) Filed: Dec. 11, 2015

(65) Prior Publication Data

US 2017/0167925 A1 Jun. 15, 2017

(51) Int. Cl.
| | | |
|---|---|---|
| *G01K 7/00* | (2006.01) | |
| *G01K 7/24* | (2006.01) | |
| *G01K 1/08* | (2021.01) | |
| *G01K 3/00* | (2006.01) | |

(52) U.S. Cl.
CPC ............... *G01K 7/24* (2013.01); *G01K 1/08* (2013.01); *G01K 3/005* (2013.01); *G01K 2211/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,163,205 | B2* | 4/2012 | Zhou | H01B 1/20 252/502 |
| 8,813,352 | B2* | 8/2014 | Huang | B29C 47/0004 252/502 |
| 8,853,540 | B2* | 10/2014 | Adriaenssens | C08K 3/04 174/126.2 |
| 2007/0044979 | A1* | 3/2007 | Popp | A62C 3/08 169/60 |
| 2007/0045756 | A1* | 3/2007 | Chang | B82Y 10/00 257/414 |
| 2008/0030352 | A1* | 2/2008 | Shaw | G08B 17/117 340/579 |
| 2009/0278461 | A1* | 11/2009 | Lee | F21V 29/004 315/112 |
| 2010/0136341 | A1* | 6/2010 | Kirkor | H01B 1/24 428/408 |
| 2011/0108978 | A1* | 5/2011 | Kim | B82Y 10/00 257/712 |
| 2012/0234000 | A1* | 9/2012 | Browne | F03G 7/065 60/527 |
| 2013/0020877 | A1* | 1/2013 | Miller | B82Y 10/00 307/104 |
| 2013/0122214 | A1* | 5/2013 | Humfeld | B05D 1/18 427/551 |
| 2013/0248229 | A1* | 9/2013 | Martens | H01B 1/04 174/255 |
| 2014/0266742 | A1* | 9/2014 | Rennie | G08B 5/36 340/584 |

\* cited by examiner

*Primary Examiner* — Lisa M Caputo
*Assistant Examiner* — Nasir U. Ahmed
(74) *Attorney, Agent, or Firm* — Joseph M. Rolnicki; Evans & Dixon, LLC

(57) ABSTRACT

According to an embodiment, a heat detection system includes a graphene conductor, a housing containing the graphene conductor; and, a signal wire connected in electrical communication with the graphene conductor, the signal wire having a length that extends from the housing.

21 Claims, 4 Drawing Sheets

LIGHTWEIGHT FIRE DETECTION SYSTEMS AND METHODS

FIELD

This disclosure is directed to heat and/or fire detection systems and methods generally and in particular for use in aerospace applications.

BACKGROUND

There is a need for improved detection of heat and/or fire in difficult to access areas of an aircraft. There also are no fire detection systems that run throughout the entire aircraft because of cost, weight, and the durability requirements for aircraft certification and operation.

Current heat and/or fire detection systems for aircraft can be easily damaged. The systems are highly susceptible to vibration during normal operating conditions. They can also be inadvertently damaged from maintenance, inspection, and repair and from loading and unloading of cargo. Current heat and/or fire detection systems are often attached to engine components and auxiliary power unit (APU) components, exposing them to maximum vibration loads. A typical heat and/or fire sensor is surrounded by an insulator. Due to the high vibration environment, the insulator can develop cracks which allows the vibration to be transmitted to the sensor causing it to break and fail. When such sensors fail, the possibility of detecting fire in the early stages is either substantially diminished or eliminated altogether.

Many existing heat and/or fire detection systems for aircraft require the presence of visible flames or smoke to be detected. This allows conditions for a fire to occur and the conditions to grow without detection. In some cases, rapid propagation of a fire could make existing smoke and fire detection systems entirely ineffective. Adding additional sensors in the cargo compartment may not be effective because cargo could block the additional sensors, nulling their sensing capabilities. With the current construction of heat and/or fire detection sensors, adding large numbers of sensors to the aircraft cargo compartment may also undesirably increase the weight of the aircraft.

SUMMARY

The heat detection systems and methods of this disclosure employ flexible, lightweight heat and fire sensors that are effective in sensing all types of overheating and fire situations. The flexibility and lightweight enables the sensors to be placed throughout the entire aircraft without significantly increasing the weight of the aircraft and without compromising the performance of the sensors. The heat detection systems and methods of this disclosure include overheat and/or fire detection sensors that employ a graphene conductor. According to an embodiment, a heat detection system includes a graphene conductor, a housing containing the graphene conductor, and a signal wire connected in electrical communication with the graphene conductor, the signal wire having a length that extends from the housing.

According to another embodiment, a heat detection system includes a graphene conductor, the graphene conductor being a flexible, lightweight wire, an electrical resistivity monitor; and, an electric circuit electrically communicating the graphene conductor with the electrical resistivity monitor.

According to yet another embodiment, a method of forming a heat detection system includes encapsulating a graphene conductor partially surrounded by a ceramic insulator and a metal housing to form a graphene thermal resistor, connecting a first signal wire in electrical communication with a first end of the graphene conductor and a second signal wire in electrical communication with a second end of the graphene conductor in the graphene thermal resistor, and extending the first and second signal wires from the graphene thermal resistor to an electric resistivity monitor to form an electric circuit.

Further features of the heat detection system employing a graphene conductor are set forth in the following detailed description of the system and in the drawing figures.

DETAILED DESCRIPTION

Figure 1:
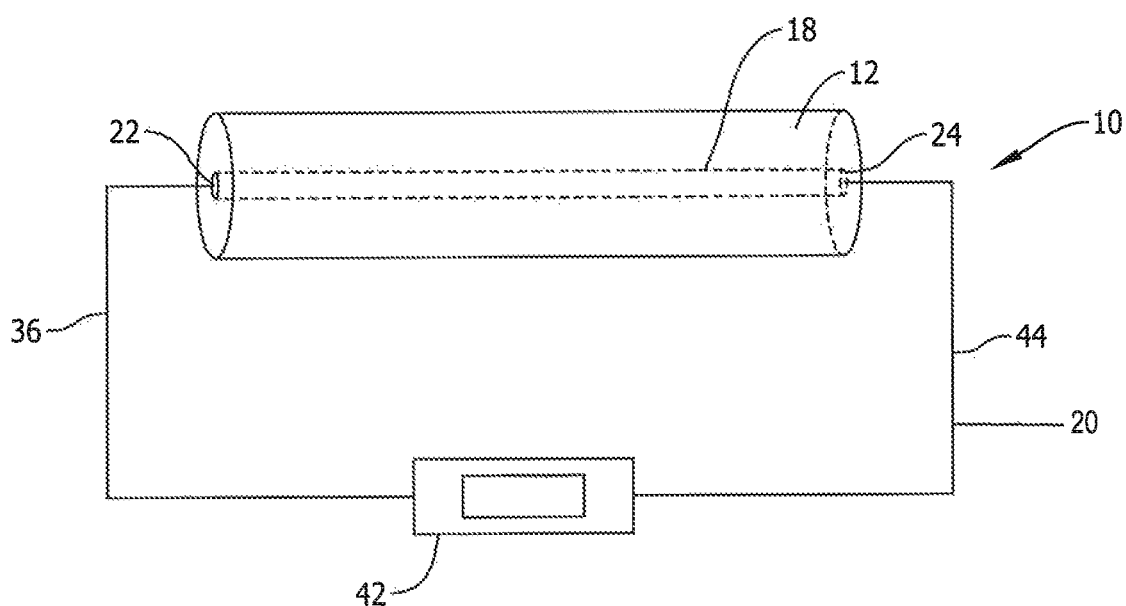
FIG. 1 is a schematic representation of a heat detection system employing a graphene sensor in a resistivity monitoring circuit.

FIG. 1 is a representation of a heat detection system 10 comprising a graphene thermal resistor 12 and forming a part of an electrical circuit 20. Graphene is a series of carbon atoms arranged in a hexagonal pattern in a very thin layer that is one atom thick and nearly transparent. Graphene is remarkably strong, has a very low weight (about 100 times stronger than steel per pound) and it conducts heat and electricity with great efficiency.

The graphene thermal resistor 12 is capable of detecting heat and fire in highly dynamic and extreme environments of an aircraft such as cargo compartments, fuel tanks, heat ducts, engines, engine support structures and strut areas (nacelle and engine system wing attachments). The graphene thermal resistor 12 is extremely durable in excessive vibration and high temperature environments. The graphene thermal resistor 12 is lightweight and has a small footprint. This enables fire detection systems such as that represented in FIG. 1 to be easily placed throughout an aircraft via a matrix network configuration 14 such as that represented in FIG. 4, thereby providing early and reliable heat, smoke, and fire detection throughout the aircraft 16.

In the representation of FIG. 1, the graphene thermal resistor 12 includes a graphene conductor 18. Electrical resistance properties of the graphene conductor 18 change with temperature.

Figure 3:
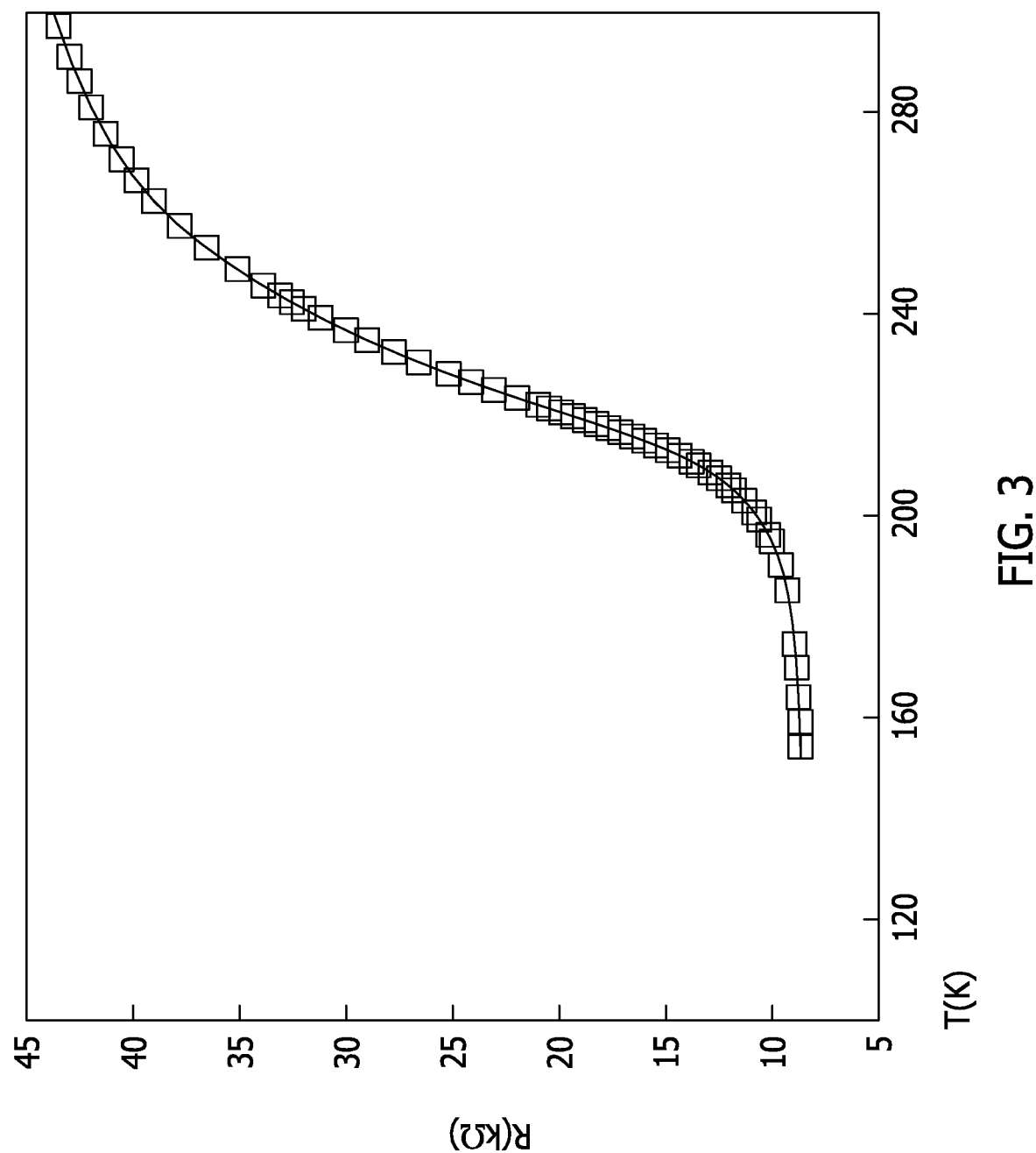
FIG. 3 is a graphical representation of an exemplary electrical resistance change in a graphene conductor in response to temperature change.

Referring to FIG. 3, there is shown a graphical representation of an exemplary resistance change in the graphene conductor 18 with respect to temperature change. As represented in FIG. 3, the resistance of the graphene conductor 18 increases in response to the graphene conductor being subjected to increasing temperature. FIG. 3 represents that graphene can be used as an effective temperature sensor by monitoring the change in resistance with temperature.

A graphene fire sensor such as the graphene thermal resistor 12 represented in FIG. 1 can be used in many configurations. The graphene thermal resistor could be used in a continuous loop detection system configuration such as that represented in FIG. 1, or as a bridge resistor type sensor.

In the heat detection system 10 represented in FIG. 1, the graphene thermal resistor 12 includes the graphene conductor 18 in the form of a lightweight wire. The graphene conductor 18 extends through a center of the graphene thermal resistor 12 between a first end 22 of the conductor and an opposite second end 24 of the conductor as shown in a partial phantom view of the graphene thermal resistor 12.

Figure 2:
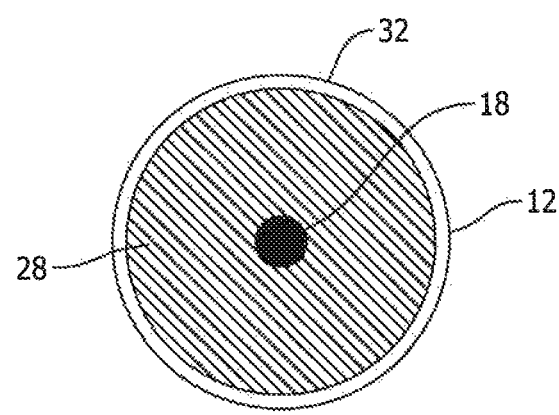
FIG. 2 is a representation of an enlarged, cross-section view of the graphene conductor sensor of FIG. 1.

An insulating material 28 surrounds the graphene conductor 18. The insulating material 28 partially surrounds the graphene conductor 18 as can best be seen in the representation of the partial phantom view of the graphene thermal resistor 12 in FIG. 1 and the cross-section of the graphene thermal resistor 12 of FIG. 2. In the representation of the graphene thermal resistor 12 of FIGS. 1 and 2, the insulating material 28 may be constructed of a ceramic material. Asbestos paste or high temperature Teflon® insulation may also be used. When constructed of a ceramic material, the insulator 28 may be considered a ceramic insulator.

A metal housing 32 encloses the graphene conductor 18 and the insulating material 28. The housing 32 completely encloses the graphene conductor 18 and the insulating material 28 except for the exposed first end 22 and second end 24 of the graphene conductor at the opposite ends of the graphene thermal resistor 12. Although the graphene conductor 18 is extremely strong, the housing 32 provides further damage resistance to the graphene conductor 18 enabling the graphene thermal resistor 12 to endure more airplane cycles than existing heat detection systems. The housing may be constructed of a metal alloy such as Inconel®, nickel, zinc or aluminum oxide.

A first signal wire 36 is connected in electrical communication with the graphene conductor 18. As represented in FIG. 1, the signal wire 36 is electrically communicated with the first end 22 of the graphene conductor 18. The signal wire 36 extends from the graphene thermal resistor 12 and from the harsh environment of the aircraft where the graphene thermal resistor 12 is positioned, to an electrical resistivity monitor 42. In the heat detection system represented in FIG. 1, a second signal wire 44 is also connected in electrical communication with the graphene conductor 18. As represented in FIG. 1, the second signal wire 44 is connected in electrical communication with the second end 24 of the graphene conductor 18. The second signal wire 44 extends from the graphene thermal resistor 12 and the harsh environment of the aircraft where the thermal resistor 12 is positioned to the electrical resistivity monitor 42.

In the simple schematic of the heat detection system 10 represented in FIG. 1, the graphene thermal resistor 12, when subjected to heat, increases in electrical resistance. The electrical resistivity monitor 42 displays a representation of the increasing heat of the environment of the graphene thermal resistor 12 that causes the resistivity of the graphene conductor 18 to increase. In this manner, the electric circuit 20 of the heat detection system 10 provides a lightweight, durable, damage resistant fire detection system that is able to endure more airplane cycles than existing systems.

The graphene fire detection system of FIG. 1 will operate by monitoring levels of heat and detecting overheat conditions in different areas of an aircraft as well as by detecting fire situations in different areas of an aircraft. This information is communicated to the flight deck where it is monitored by the crew. The overheat warning, at a temperature well below the fire warning, indicates a general temperature rise due to hot bleed air leakage or combustion gases into an area of concern inside and outside of firewalls of an aircraft, and indicates a dangerous situation in areas highly sensitive to high temperature conditions.

The graphene fire detection system will operate accurately to determine a temperature rise situation of concern starting at 100° C., and determining a temperature range of 100° C.-2,000° C. This eliminates any possibility of overheat damage and any risk associated with overheating. The system can also be programmed to operate to sense rate of temperature rise conditions as well as fixed temperature set points.

For example, the graphene fire detection system can have an overheat set point typically around 500° C., and at that temperature will send overheat indication signals to the flight deck. The fire set point detection temperature will adhere to well published guidelines at 1,500° C. (and within ten seconds of flame onset) and 2,000° C. (within five seconds of flame onset).

In conditions of a fire, the temperature increases substantially and the outer housing 32 of the graphene thermal resistor 12 heats up to close to the temperature of the fire. This in turn increases the temperature of the graphene conductor 18 contained in the housing 32. The electrical resistivity of the graphene conductor 18 is proportional to its temperature as represented in FIG. 3. As the temperature increases, the resistivity of the graphene conductor 18 increases as well. Even a small amount of change in the resistivity in the graphene conductor 18 can be detected by the electrical resistivity monitor 48 which could include a four way bridge resistor or other equivalent device.

Additionally, the increase in the resistivity of the graphene conductor 18 can also cause a voltage drop. In place of the electrical resistivity monitor 42, an equivalent voltage monitor could be used. The voltage monitor could be calibrated to monitor changes in voltage of the electric circuit 20 that in turn could be used to monitor changes in temperature in the environment of the graphene thermal resistor 12 in the same manner as the electrical resistivity monitor 42 described earlier.

The fire detection system of FIG. 1 will increase aircraft reliability and safety. It will enable significant airplane fuel savings and efficiency due to its lightweight, and will be much easier to install in the small, constricted, and difficult to access spaces around different aircraft structures, such as aircraft engines due to its high flexibility and small size. The flexibility and small size of the system represented in FIG. 1 will reduce installation and maintenance times for the fire detection system and other engine systems local to the fire detection system. The flexibility and the light weight of the graphene conductor wire further enables the sensor constructed of the graphene conductor wire to be positioned throughout an aircraft construction in difficult to access areas. The flexibility of the wire also enables the graphene wire sensors to be used in many configurations to conform to the configuration of the aircraft structure that is to be monitored by the graphene sensors.

Figure 4:
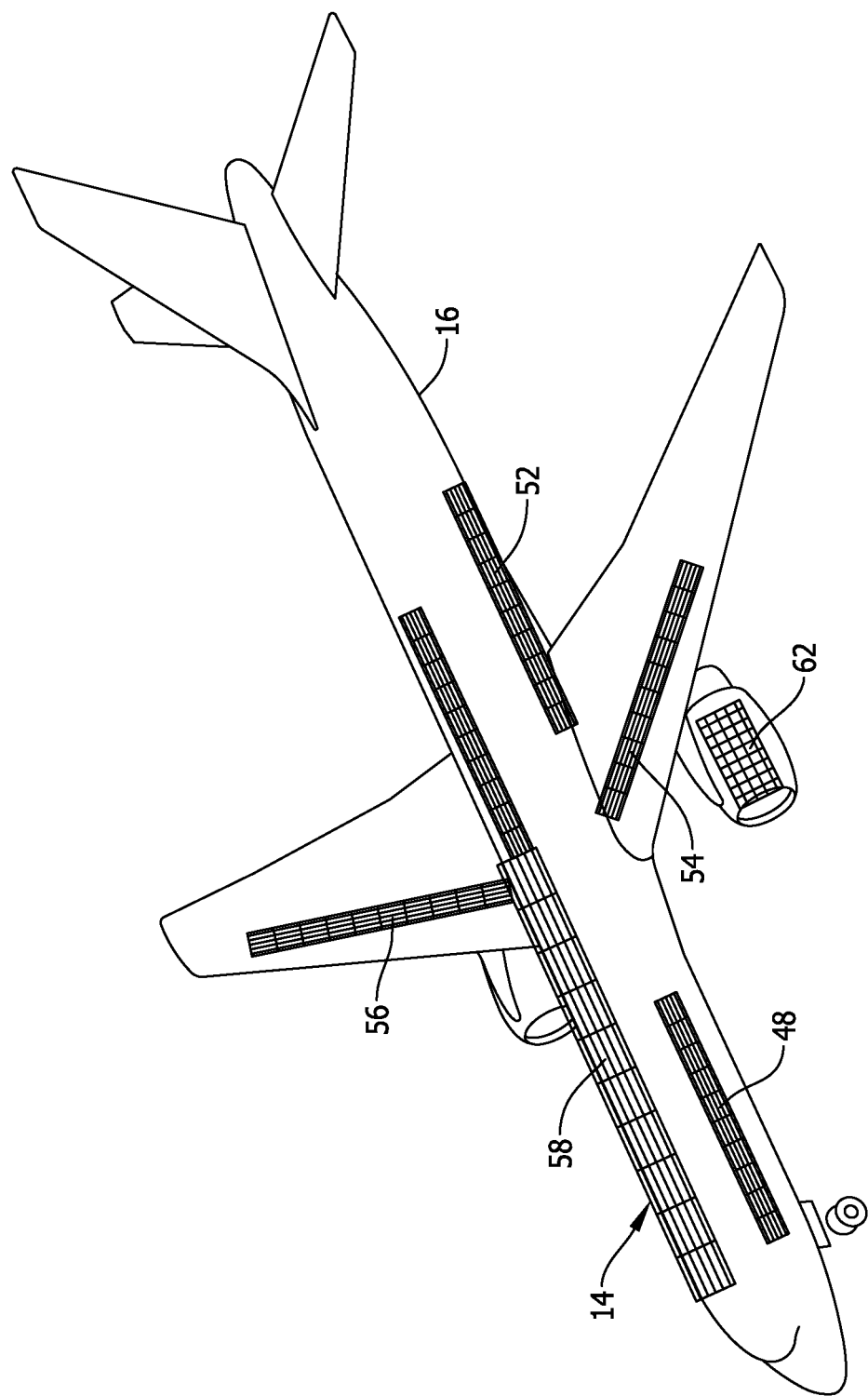
FIG. 4 is a representation of a perspective view of an aircraft employing a heat and/or fire detection system comprised of a matrix of the electrical resistivity monitoring circuits represented in FIG. 1.

Furthermore, due to its flexibility and small size, a plurality of fire detection systems such as the fire detection system 10 represented in FIG. 1 can be positioned throughout the different aircraft structures as part of a matrix network configuration. As one example, the heat detection system 10 may include the graphene conductor 18 being one of a plurality of graphene conductors, the electrical resistivity monitor 42 being one of a plurality of electrical resistivity monitors; and the electric circuit 20 being one of a plurality of electric circuits communicating each graphene conductor of the plurality of graphene conductors with an associated electrical resistivity monitor of the plurality of electrical resistivity monitors. The graphene wire is also extremely durable in excessive vibration and high temperature environments. Referring to FIG. 4, portions 48, 52 of such a matrix could be located in the cargo compartments, portions 54, 56 of the matrix could be located by the fuel tanks in the wings, portions 58 of the matrix could be located in auxiliary power units and portions of the matrix could be located in the engines 62 or engine cowlings of the aircraft 16.

Figure 5:
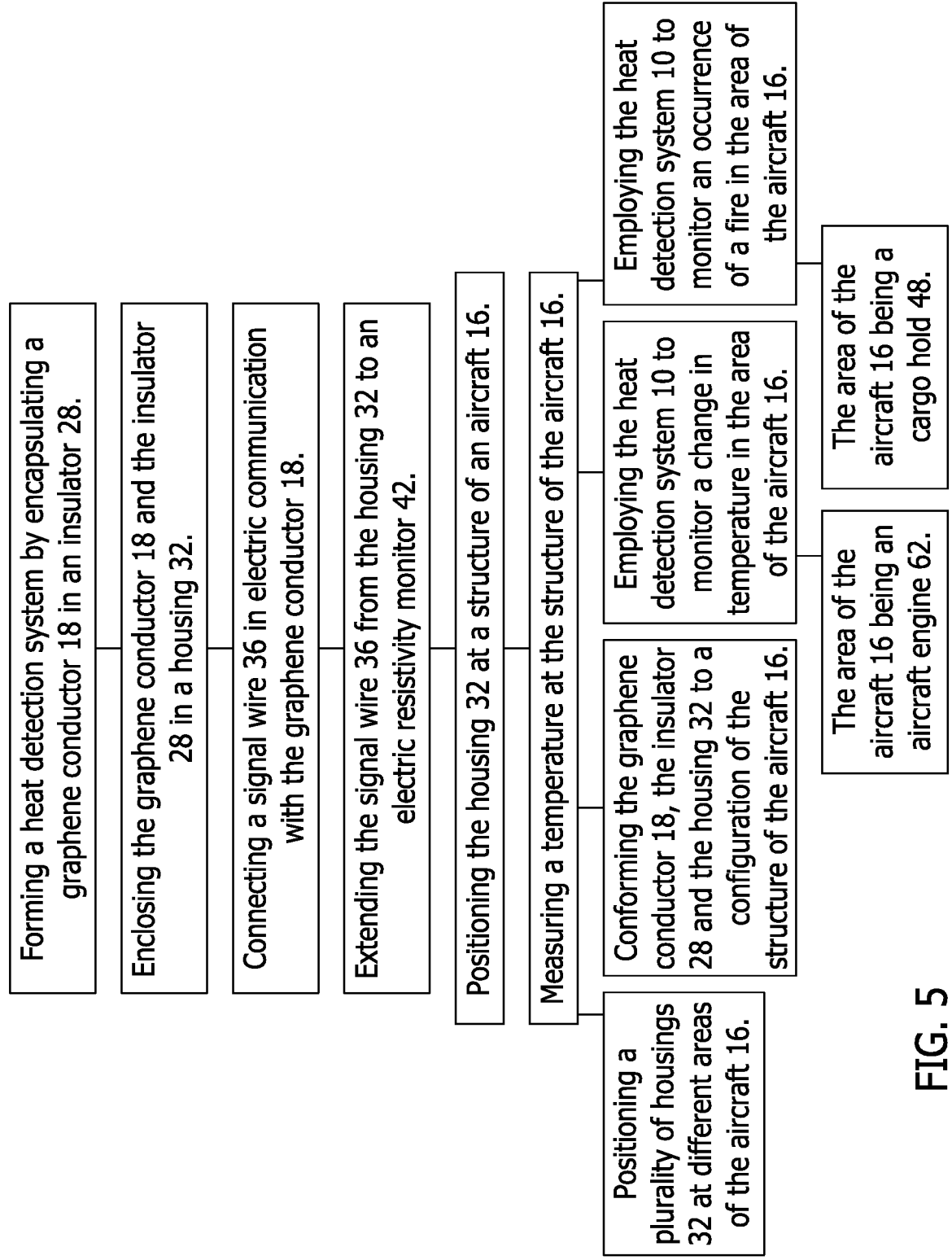
FIG. 5 is a flow chart representation of a method of forming a heat detection system.

Referring to FIG. 5, a method 500 of forming a heat detection system includes various steps. Method 500 begins with encapsulating a graphene conductor wire 18 that is partially surrounded by an insulator 28. The insulator 28 could be a ceramic insulator. The graphene conductor 18 and the insulator 28 are then enclosed in a metal housing 32 to form a graphene thermal resistor 12, as referenced in block 502. A first signal wire 36 is connected in electric communication with a first end 22 of the graphene conductor 18, and a second signal wire 44 is connected in electric communication with a second end 24 of the graphene conductor 18, as referenced in block 504. Method 500 continues with the signal wires (36, 44) are extended from the graphene thermal resistor 12 to an electric resistivity monitor 42 to form an electric circuit 20, as referenced in block 506.

The housing 32 may be positioned within a region or at a structure of an aircraft 16 where temperature is to be measured. One or more of the thermal resistors 12 could be positioned at a plurality of different areas of the aircraft 16, as referenced in block 508. Furthermore, one or more of the thermal resistors 12 could be configured to conform to a configuration of the structure of the aircraft 16, as referenced in block 510.

The method 500 concludes with the heat detection system being employed to monitor a change in temperature in one or more areas of the aircraft 16 and/or to monitor an occurrence of a fire. For example, the area or region of the aircraft 16 could be in or near an engine 62 or engine cowling, a cargo hold 52, a crew rest area, a crown region, a bilge region, a cockpit panel or other cockpit region, an electrical panel, a lavatory, or any other area that may be difficult to reach or inconvenient to inspect, or where high temperature may be generated. The heat detection system may be employed to detect temperature and/or possible fire in other vehicles such as armored vehicles, boats, cars, trucks/trailers, military transports, ships, recreational vehicles, and trains.

As described, the heat detection system 10 could be employed to monitor an occurrence of a fire in an area of an aircraft 16 or other vehicle. A rapid increase in temperature at a particular location and/or a progressive increase in temperature detected in one or more dimensions of the graphene thermal resistors 12 in a matrix 14 composed of a plurality of thermal resistors could indicate a spreading fire.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A heat detection system (10) in an aircraft (16) comprising:
   a graphene conductor wire (18);
   a housing (32) containing the graphene conductor wire; and,
   a first signal wire (36) connected in electrical communication with the graphene conductor wire, the first signal wire having a length that extends from the graphene conductor wire and from an environment of the aircraft where the graphene conductor wire is positioned.

2. The heat detection system (10) in an aircraft (16) of claim 1, further comprising:
   a second signal wire (44) connected in electrical communication with the graphene conductor wire (18), the second signal wire having a length that extends from the graphene conductor wire and from the environment of the aircraft where the graphene conductor wire is positioned.

3. The heat detection system in an aircraft (16) of claim 1, further comprising:
   the graphene conductor wire (18) is a flexible, lightweight wire placed throughout the aircraft by way of a matrix network configuration.

4. The heat detection system in an aircraft (16) of claim 1, further comprising:
   the graphene conductor wire (18) is one of a plurality of graphene conductor wires placed throughout the aircraft (16); and,
   the first signal wire (36) is one of a plurality of first signal wires, each first signal wire of the plurality of first signal wires being connected in electrical communication with a graphene conductor wire of the plurality of graphene conductor wires.

5. The heat detection system in an aircraft (16) of claim 4, further comprising:
   the plurality of graphene conductor wires (18) are positioned in the aircraft (16) at a plurality of different areas of the aircraft for monitoring levels of heat at the plurality of different areas of the aircraft.

6. The heat detection system in an aircraft (16) of claim 1, further comprising:
   the graphene conductor (18) wire being surrounded by an insulator (28); and,
   the housing (32) contains the graphene conductor wire and the insulator
   the housing (32) contains the graphene conductor wire and the insulator and forms a graphene thermal resistor (12).

7. The heat detection system in an aircraft (16) of claim 6, further comprising:
   the insulator (28) including at least one of a ceramic material, asbestos paste, or high temperature insulation.

8. The heat detection system in an aircraft (16) of claim 7, further comprising:
   the housing (32) being constructed of a metal alloy, the metal alloy including at least one of nickel, zinc or aluminum oxide.

9. The heat detection system in an aircraft (16) of claim 1, further comprising:
   the graphene conductor wire (18) having a configuration that conforms to a configuration of an aircraft structure.

10. A heat detection system (10) in an aircraft (16) comprising:
   a graphene conductor wire (18), the graphene conductor wire being a flexible, lightweight wire;
   an electrical resistivity monitor (42); and,
   an electric circuit (20) electrically communicating the graphene conductor wire from an environment of the aircraft where the graphene conductor wire is positioned with the electrical resistivity monitor.

11. The heat detection system in an aircraft (16) of claim 10, further comprising:
the graphene conductor wire (18) being one of a plurality of graphene conductor wires placed throughout the aircraft (16);
the electrical resistivity monitor (42) being one of a plurality of electrical resistivity monitors; and,
the electric circuit (20) being one of a plurality of electric circuits communicating each graphene conductor wire of the plurality of graphene conductor wires with an associated electrical resistivity monitor of the plurality of electrical resistivity monitors.

12. The heat detection system in an aircraft (16) of claim 11, further comprising:
the plurality of graphene conductor wires (18) being positioned in the aircraft (16) at a plurality of different aircraft structures of the aircraft.

13. The heat detection system in an aircraft (16) of claim 10, further comprising:
the graphene conductor wire (18) being partially surrounded by an insulator (28); and,
a housing (32) containing the graphene conductor wire and the insulator to form a graphene thermal resistor (12).

14. The heat detection system in an aircraft (16) of claim 13, further comprising:
the insulator (28) including at least one of a ceramic material, asbestos paste, or high temperature insulation.

15. The heat detection system in an aircraft (16) of claim 14, further comprising:
the housing (32) including a metal alloy, the metal alloy including at least one of nickel, zinc or aluminum oxide.

16. A method (500) of forming a heat detection system (10) in an aircraft (16), the method comprising:
encapsulating (502) a graphene conductor wire (18) partially surrounded by a ceramic insulator (28) and a metal housing (32) to form a graphene thermal resistor (12);
connecting (504) a first signal wire (36) in electrical communication with a first end of the graphene conductor wire and a second signal wire (44) in electrical communication with a second end of the graphene conductor wire in the graphene thermal resistor; and,
extending (506) the first and second signal wires from the graphene thermal resistor and from an environment of the aircraft where the graphene thermal resister is positioned to an electric resistivity monitor (42) to form an electric circuit (20).

17. The method of claim 16, further comprising:
positioning (508) the graphene thermal resistor at a structure of an aircraft (16) where temperature is to be measured.

18. The method of claim 17, further comprising:
conforming (510) the graphene thermal resistor to a configuration of the structure of the aircraft (16).

19. The method of claim 17, wherein positioning the graphene thermal resistor further comprises:
positioning a plurality of graphene thermal resistors in a plurality of different areas of an aircraft (16).

20. The method of claim 16, further comprising:
employing (512) the heat detection system to at least one of monitor a change in temperature in an area of an aircraft (16) and monitor an occurrence of a fire in an area of the aircraft.

21. The method of claim 20, further comprising:
the area of the aircraft being one of an engine (62) and a cargo hold (48) of the aircraft.

* * * * *